United States Patent
Frank et al.

(10) Patent No.: US 8,578,143 B2
(45) Date of Patent: Nov. 5, 2013

(54) MODIFYING OPERATING PARAMETERS BASED ON DEVICE USE

(75) Inventors: Michael Frank, Sunnyvale, CA (US); Patrick D. McNamara, San Francisco, CA (US); Date Jan Willem Noorlag, Fremont, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 13/109,265

(22) Filed: May 17, 2011

(65) Prior Publication Data

US 2012/0297174 A1 Nov. 22, 2012

(51) Int. Cl.
*G06F 15/177* (2006.01)
*G01N 27/00* (2006.01)
*G01R 35/06* (2006.01)

(52) U.S. Cl.
USPC ............... 713/1; 713/2; 713/300; 324/71.1; 324/76.11

(58) Field of Classification Search
USPC .................. 713/1, 2, 300; 324/71.1, 76.11
See application file for complete search history.

(56) References Cited

U.S. PATENT DOCUMENTS

| | | | |
|---|---|---|---|
| 4,633,422 A | 12/1986 | Brauer | |
| 5,239,271 A | 8/1993 | Ben-Efraim | |
| 6,903,564 B1 * | 6/2005 | Suzuki | 324/762.02 |
| 6,933,869 B1 | 8/2005 | Starr et al. | |
| 7,005,871 B1 | 2/2006 | Davies et al. | |
| 7,183,799 B1 | 2/2007 | Donlin et al. | |
| 7,262,753 B2 * | 8/2007 | Tanghe et al. | 345/82 |
| 7,423,488 B2 | 9/2008 | Hunter et al. | |
| 7,471,161 B2 | 12/2008 | Liu | |
| 7,475,320 B2 | 1/2009 | Knebel et al. | |
| 7,592,876 B2 | 9/2009 | Newman | |
| 7,652,317 B2 | 1/2010 | Watanabe | |
| 7,765,412 B1 | 7/2010 | Burr et al. | |
| 7,793,119 B2 | 9/2010 | Gammie et al. | |
| 7,917,772 B1 * | 3/2011 | Koniaris et al. | 713/300 |
| 2006/0049886 A1 * | 3/2006 | Agostinelli et al. | 331/175 |
| 2007/0132523 A1 * | 6/2007 | Newman | 331/175 |
| 2008/0155282 A1 * | 6/2008 | Gammie et al. | 713/300 |
| 2008/0263383 A1 * | 10/2008 | Knebel et al. | 713/501 |
| 2010/0134167 A1 * | 6/2010 | Papageorgiou et al. | 327/175 |
| 2011/0101990 A1 | 5/2011 | Noorlag et al. | |
| 2011/0102064 A1 | 5/2011 | Noorlag et al. | |
| 2011/0181315 A1 * | 7/2011 | Krishnan | 324/762.01 |
| 2012/0297174 A1 * | 11/2012 | Frank et al. | 713/1 |
| 2013/0054179 A1 * | 2/2013 | Shapira et al. | 702/117 |

FOREIGN PATENT DOCUMENTS

| | | |
|---|---|---|
| CN | 1870479 | 11/2006 |
| FR | 2776152 | 9/1999 |

* cited by examiner

*Primary Examiner* — Vincent Tran
(74) *Attorney, Agent, or Firm* — Meyertons, Hood, Kivlin, Kowert & Goetzel, P.C.

(57) ABSTRACT

Monitoring aging information for multiple devices. Aging information of the devices may be received. Statistics regarding the multiple devices may be determined based on the aging information. For at least some of the devices, update information may be determined based on the respective aging information. The update information may include modifications to operating parameters of the devices. For example, the devices may operate according to initial parameters that are above sustainable parameters and the update information may lower the operating parameters based on the aging information.

22 Claims, 7 Drawing Sheets

MODIFYING OPERATING PARAMETERS BASED ON DEVICE USE

BACKGROUND

1. Field of the Invention

This invention relates to electronic circuits, and more particularly, to methods and mechanisms to record and/or compensate for the aging of the electronic circuits.

2. Description of the Related Art

Over the life an electronic circuit, the effects of aging may have an impact on its operation. Factors such as operating time, voltage, and temperature may change one or more characteristics of various circuit elements. For example, the threshold voltage of a transistor may change over the operating life of an integrated circuit (IC) in which it is implemented. A change in the threshold voltage of one or more transistors may in turn require a change in the supply voltage supplied to the IC. Generally speaking, an increase in the absolute value of a threshold voltage of one or more transistors in an IC may correspond to an increase in the required supply voltage for correct operation.

One common degradation mechanism that manifests itself during the aging of transistors in electronic circuits is negative bias temperature instability (NBTI), which may apply to PMOS (p-channel metal oxide semiconductor) transistors. The affects on a PMOS transistor of NBTI over a period of time may cause an increase in the absolute value of the threshold voltage, along with a decrease in drain current and transconductance. As the absolute value of the transistor's threshold voltage increase over time, a higher supply voltage value is required to ensure that the circuit operates properly. A similar phenomenon, positive bias temperature instability (PBTI) may affect NMOS (n-channel metal oxide semiconductor) transistors. Another potential degradation mechanism is hot carrier injection (HCI), wherein electrons or holes may gain sufficient kinetic energy to overcome potential barriers between different portions of the silicon (e.g., the potential barrier between the silicon substrate and the gate dielectric). Over time, HCI may degrade the gate dielectric of a transistor, increase its sub-threshold leakage current, and may also shift the threshold voltage.

SUMMARY

Various embodiments are described of a method for collecting and adjusting for aging of electronic circuits in a device.

More particularly, aging information for multiple devices may be received, e.g., over a wide area network, such as the Internet. The aging information may be received by a local computer that is coupled to the device. In one embodiment, the local computer may execute a management program for interrogating (or managing) the device. Additionally, or alternatively, the aging information may be received by one or more remote computers (e.g., servers). Where the aging information is received by the remote computers, it may be received via a local computer (e.g., where the local computer receives the aging information and provides it to the remote computers) or directly from the device itself (e.g., where the device provides the aging information to the remote computers without using a local computer).

The devices may be of a common type and common generation or have a similar design. The aging information may specify aging of one or more electronic circuits in each device, and may therefore indicate aging for the device. For example, the aging information may indicate the operating conditions of the device while the device is being used (e.g., operating temperature, operating voltage, operating frequency, etc.). In one embodiment, the aging information may be generated by the device based on dedicated aging circuits included in the device. Additional information may also be received for the devices, e.g., including usage information (e.g., time of the day that the devices are being used), battery condition information, location information, operating and environment temperature information, shaking information (e.g., when devices are being used for gaming), etc.

The aging information may be used for a variety of purposes. For example, in one embodiment, statistics (e.g., regarding operation of the devices) may be determined for the multiple devices using the aging information. For example, the statistics may include the average aging of the devices and/or aging based on the various received additional information (e.g., based on location of the devices, shaking of the devices, operating or environmental temperature of the devices, etc.). The statistics may be used for determining operating parameters for the devices, designing new devices, refining assumptions of use of the devices, etc.

The aging information may also be used to determine new operating parameters for a particular device. For example, the aging information of the particular device may be received and update information may be generated that modifies operating parameters of the device. For example, the operating parameters may include operating frequency, operating voltage(s), etc. The generated operating parameters may ensure that the device meets its life expectancy (e.g., ensuring that the current operating parameters will not age the device at a rate that will cause the device to no longer function before reaching its life expectancy), improve battery life, improve performance, improve user experience, etc.

The update information may be based on the aging information of the device, the additional information of the device, and/or the aging information and/or additional information of the multitude of devices. For example, the update information may be based not only on the aging information or additional information of the device, but also on the statistics of the multiple devices described above.

The update information may be generated by the local computer, the remote computers, or even the device itself, as desired. For example, the device may monitor its own usage or aging and determine updates to its operating parameters based on the aging. Alternatively, or additionally, the local computer or remote computers may generate the update information based on the received aging information and/or additional information.

In some embodiments, one or more of the devices may be initially configured to operate according to first operating parameters that are above sustainable operating parameters. For example, the sustainable operating parameters may be based on assumptions of use of the device. The assumptions may be overly conservative, e.g., assuming that the device will be operated non-stop over the desired lifetime of the device (e.g., 5 years). Accordingly, the first operating parameters may be above those operating parameters (e.g., with a higher operating frequency and/or operating voltage and/or operating temperature). In one embodiment, the first operating parameters may allow the device to initially operate with higher performance than would be achieved using the sustainable operating parameters.

Use of the device(s) may be monitored over time, e.g., by receiving the aging information described above. Accordingly, each device may be later configured according to respective second operating parameters based on the monitoring of use of the device. The second operating parameters may generally be lower than the first operating parameters, e.g., if the device has experienced enough aging or use to require a change in operating parameters. The second operating parameters may be determined as described in the update information above.

Use and/or aging of each device and subsequent updating of the device may be performed one or more times throughout the life of the device. Accordingly, the operating parameters of the device may be changed over time as the electronics of the device ages. Thus, the operating parameters of each device may change in accordance with the aging of that particular device, which may allow the device to have better performance, battery life, user experience, etc. than would normally be possible without monitoring and updating the device, as described herein.

BRIEF DESCRIPTION OF THE DRAWINGS

The following detailed description makes reference to the accompanying drawings, which are now briefly described.

Figure 1A:
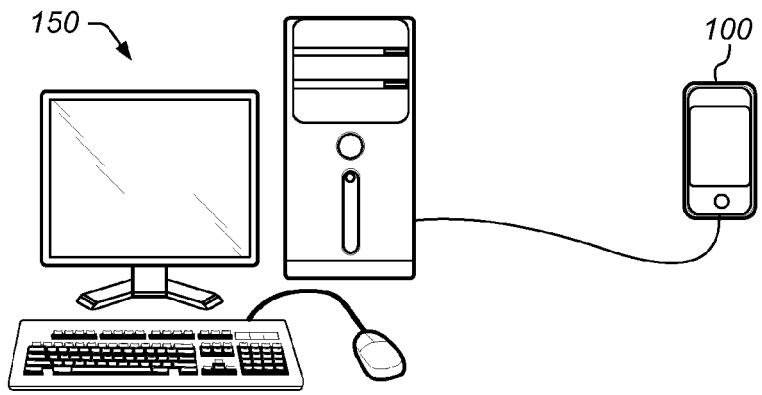
FIGS. 1A-1C illustrate exemplary systems, according to various embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory media which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, tablet, television system, grid computing system, or other device or combinations of devices. In general, the term "computer system" can be broadly defined to encompass any device (or combination of devices) having at least one processor that executes instructions from a memory medium.

Portable Device—any of various types of computer systems which are mobile or portable, including portable gaming devices (e.g., Nintendo DS™, PlayStation Portable™, Gameboy Advance™, iPhone™), laptops, tablets, PDAs, mobile telephones, handheld devices, portable Internet devices, music players, data storage devices, etc. In general, the term "portable device" can be broadly defined to encompass any electronic, computing, and/or telecommunications device (or combination of devices) which is easily transported by a user.

Communication Device—any of various devices which are capable of communicating with other devices, e.g., wirelessly. Communication Device is a superset of portable devices with communication capabilities (e.g., a Communication Device may be portable or stationary). Communication devices include cell phones, wireless access points (e.g., wireless routers) and other devices capable of communicating with other devices.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
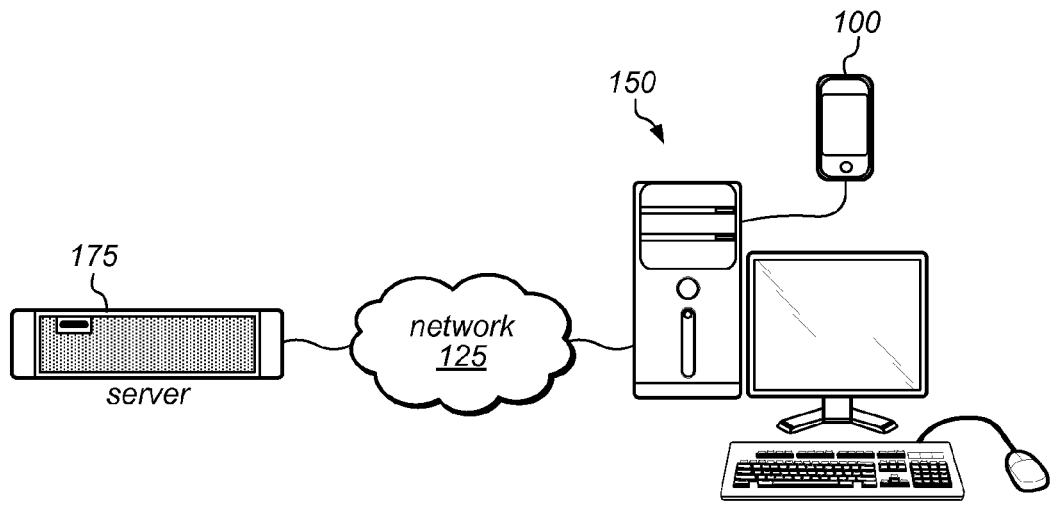
Figure 1C:
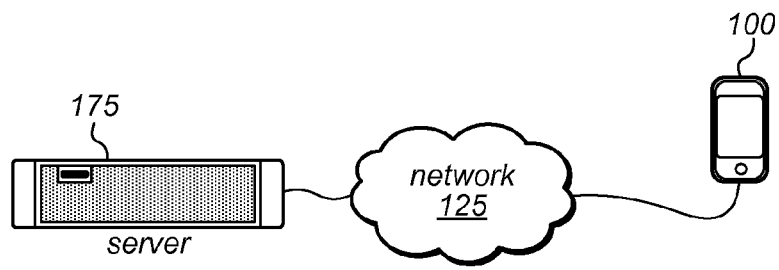

FIGS. 1A-1C—Exemplary Systems

FIGS. 1A-1C illustrate various systems that may implement embodiments described herein. More particularly, FIGS. 1A-1C illustrates various embodiments where a device 100 may be coupled to different computer systems in different configurations.

The device 100 may be any of various devices. For example, the device 100 may be a portable or mobile device, such as a mobile phone, tablet, PDA, audio/video player, etc. In one embodiment, the device 100 may be a wireless device that is configured to communicate with other devices (e.g., other wireless devices, wireless peripherals, cell towers, access points, etc.) using one or more wireless channels. As used herein, a "wireless device" refers to a device that is able to communicate with other devices or systems using wireless communication. For example, the device 100 may be configured to utilize one or more wireless protocols, e.g., 802.11x, Bluetooth, WiMax, CDMA, GSM, etc., in order to communicate with the other devices wirelessly. In embodiments described herein, the device 100 may be configured to monitor aging or usage of the device 100.

As also shown in FIGS. 1A-1C, the device 100 may include a display, which may be operable to display graphics provided by an application executing on the device 100. The application may be any of various applications, such as, for example, games, internet browsing applications, email applications, phone applications, productivity applications, etc. The application may be stored in a memory medium of the device 100. As described below, the device 100 may include a processor (e.g., a CPU) and display circuitry (e.g., including a GPU) which may collectively execute these applications.

In embodiments described herein, the device 100 may be configured to monitor aging information of the device 100. The device 100 may be configured to report that aging information (and/or other information) to various computer systems. For example, the device 100 may be coupled to computer system 150 as shown in FIGS. 1A and 1B. The device 100 may, for example, provide aging information to the computer system 150, which may execute a management application for the device 100. The device 100 may also receive update information from the computer system 150, e.g., in response to the aging information of the device 100. The management application executing on the computer system 150 may also perform other functions for the device 100, e.g., synching various files between the computer system 150 and the device 100, providing firmware updates, backing up the device 100, etc.

In the embodiment of FIG. 1B, the computer system 150 may be coupled to a server (or multiple servers) over network 125 (e.g., a wide area network, such as the Internet). In this embodiment, the aging information provided to the computer system 150 may be provided to the server 175 over the network 125. The server 175 may be configured to collect aging information of multiple such devices. Additionally, the server 175 may be configured to provide update information for the device 100 in response to the aging information and/or may be configured to provide update(s) for the management program executing on the computer system 150.

In the embodiment of FIG. 1C, the device 100 may be a wireless device that is able to communicate with the server 175 directly (without using an intermediate computer system, as shown in FIG. 1B). In this embodiment, the device 100 may be configured to provide the aging information to the server 175 over the network and/or receive update information from the server 175 based on the aging information.

Figure 2:
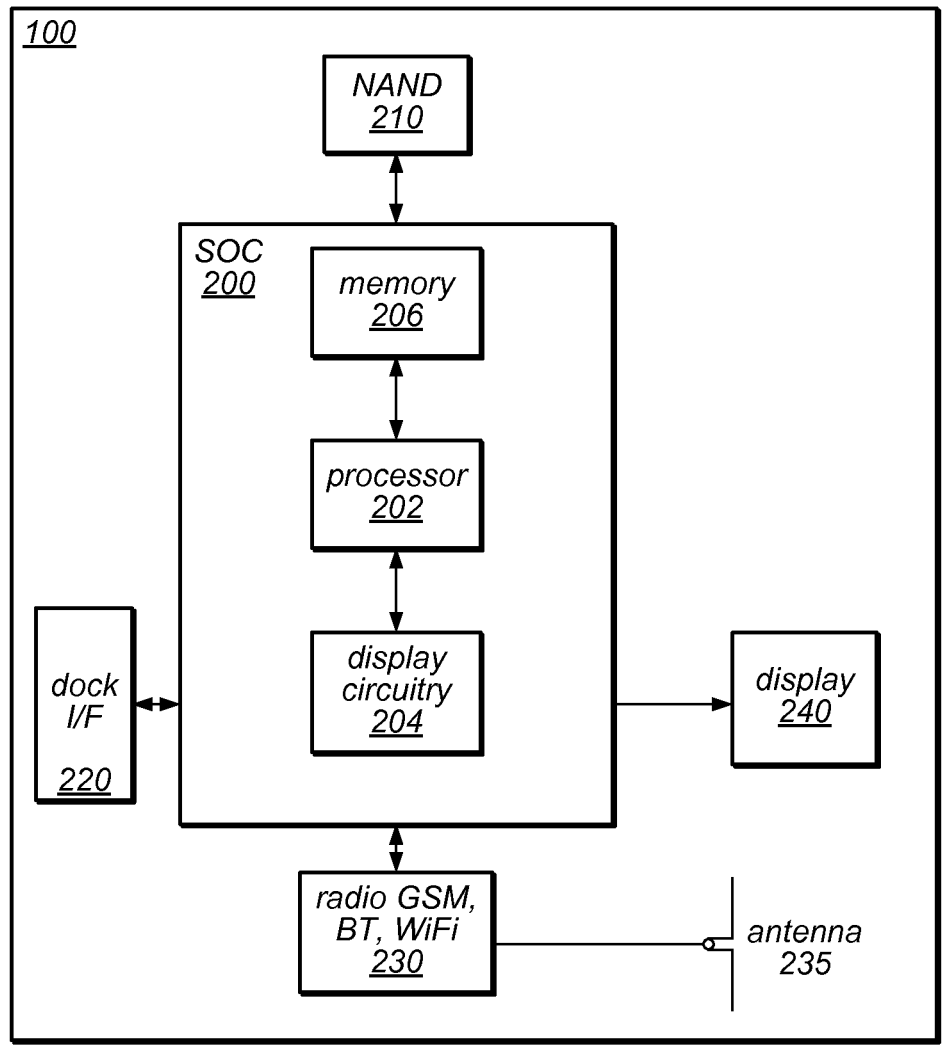
FIG. 2 is a block diagram of an exemplary device, according to one embodiment.

FIG. 2—Block Diagram of Device 100

FIG. 2 illustrates an exemplary block diagram of the device 100. As shown, the device 100 may include a system on chip (SOC) 200, which may include portions for various purposes, including processor 202, display circuitry 204, and memory medium 206. As described below, the SOC 200 may include various aging detecting circuits or other circuits or programs for determining aging or usage of the device 100.

As also shown, the SOC 200 may be coupled to various other circuits of the device 100. For example, the device 100 may include various types of memory (e.g., including NAND 210), a dock interface 220 (e.g., for coupling to the computer system 150), the display 240, and wireless communication circuitry (e.g., for GSM, Bluetooth, WiFi, etc.) which may use antenna 235 to perform the wireless communication.

Figure 3:
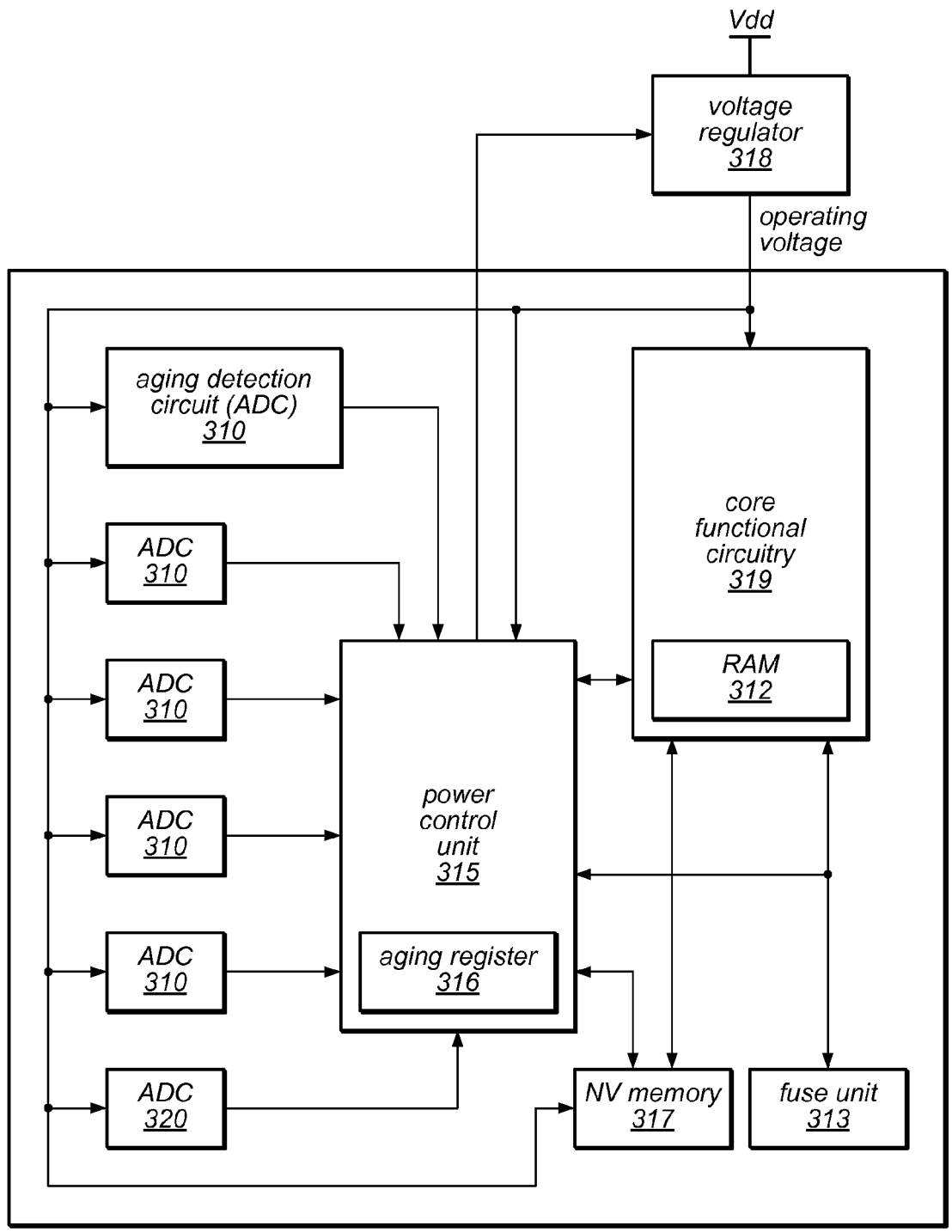
FIG. 3 is a block diagram of one embodiment of an integrated circuit (IC) having an age compensation apparatus.

FIG. 3—Integrated Circuit:

Turning now to FIG. 3, a block diagram of one embodiment of an integrated circuit (IC) 300 of device 100 is illustrated. IC 300 may be one of a number of different types of integrated circuits. For example, IC 300 may be (or may be included in) the SOC 200, incorporating a number of different functions, including processing functions, memory, I/O functions, and other types of functions associated with SOC's. In another embodiment, IC 300 may be a discrete processor, or other discrete component IC such as a bridge, an I/O component, etc. used in a computer system (e.g., in a desktop or laptop computer). IC 300 may also be an application specific integrated circuit (ASIC). Generally speaking IC 300 may be any type of IC, and may include analog and/or digital circuitry.

In the embodiment shown, IC 300 includes multiple aging detection circuits (ADC's) 310 and 320, a power control unit 315, a non-volatile (NV) memory 317, and core functional circuitry 319. The core functional circuitry may be that circuitry that is configured to perform the intended functions of IC 300. IC 300 may also be coupled to, or may include, a voltage regulator 318 coupled to receive a supply voltage and configured to provide an operating voltage. Voltage regulator 318 may be a variable voltage regulator, in which the operating voltage provided thereby may be adjusted.

As previously noted, IC 300 includes multiple aging detection circuits (ADC's) 310 and at least one ADC 320, which may be a variation of ADC 310. The ADC's 310 and 320 may be various types of circuits used to detect aging of IC 300. In some embodiments, each ADC 310 may be a ring oscillator, or a counter. Aging may be detected via variations in the frequency of the ring oscillator over time, for example. Embodiments where each of ADC's 310 is the same or similar type of circuit to ADC 320 are also possible and contemplated. Further embodiments are also possible and contemplated wherein a variety of different types of circuits are used to detect aging are implemented. Embodiments of ADC 320 will be discussed in further detail below.

Each ADC 310 and ADC 320 in the embodiment shown is coupled to power control unit 315. Power control unit 315 may perform various power control functions, including adjustment of the supply voltage based on aging of IC 300. In the embodiment shown, each ADC 310 and 320 may provide respective indications of aging to an aging register 316 of power control unit 315. Aging register 316 may store the indications of aging in order to enable power control unit 315 to make a determination of the aging of IC 300. For example, each ADC 310 and 320 may be configured to provide a bit in a first state to indicate aging of that particular ADC 310/320 up to or beyond a certain threshold, and to provide a bit in a second (complementary) state to indicate that the ADC 310/320 has not aged up to the threshold. However, in other embodiments, particular ones of ADC 310 may provide other indications of aging to power control unit 315 (e.g., a count value, a frequency, etc.), which may then be converted into information storable in aging register 316.

Power control unit 315 in the embodiment shown is configured to determine the aging of IC 300 based on the indications stored in aging register 316. In some embodiments, each individual ADC 310/320 may be configured to provide indications of aging up to a threshold value different from other instances of ADC 310/320. For example, a first ADC 310 may provide an indication responsive to aging sufficiently to cross a first threshold, while a second ADC 310 may provide an indication responsive to aging sufficiently to cross a second threshold, wherein the aging associated with the second threshold is greater (e.g., more elapsed time) than the first threshold. Thus, based on reading the indications of aging stored in aging register 316, power control unit 315 may determine the aging of IC 300 (e.g., the approximate amount of operating time elapsed for IC 300, or the approximate amount of degradation that has occurred due to aging). In other embodiments, there may be no aging register 316. The power control unit 15 may directly operate on the inputs from the ADCs 310 and 320, for example.

Additionally or alternatively, each ADC 310 or 320 may also indicate aging based on different uses of the device 100. For example, one or more ADCs may indicate aging when the device 100 is used in a first function (e.g., video), while another one or more ADCs may indicate aging when the device 100 is used in a second function (e.g., listening to music. This embodiment may be extended to any number of different functions, e.g., browsing the web, reading a book, checking email, texting, etc. In one embodiment, in order to achieve this specialization, each ADC may only operate when the respective mode is being used (e.g., ADCs associated with video may only be operated when video is played on the device 100).

It should be noted that embodiments are possible and contemplated wherein some or all of the functions performed by power control 315 are performed by software instead of hardware. For example, software instructions may be executed to determine the aging of IC 300 based on the indications of aging provide by the ADC's 310/320, to write information indicative of a specified operating voltage value to NV memory 317, and to cause signals to be provided to voltage regulator 318 in order to set the operating voltage to that specified in NV memory 317. Software instructions may also be executed to designate a portion of a memory to store the indications of aging, in lieu of providing aging register 316 (e.g. within RAM 12 of core functional circuitry 19 in the illustrated embodiment).

It is noted that the ADCs 310 and 320 are illustrated for convenience in the block diagram of FIG. 3 as separate from the area occupied by other circuitry. However, in one embodiment, the ADCs 310 and 320 may be physically distributed over the surface of the IC 300 (including the areas occupied by the core functional circuitry 319, the power control unit 315, etc.), for example to monitor differential aging in IC 300.

Figure 4A:
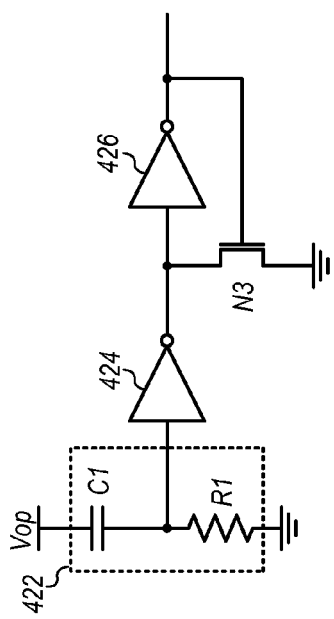
FIG. 4A is a logic diagram of one embodiment of an aging detection circuit.
Figure 4B:
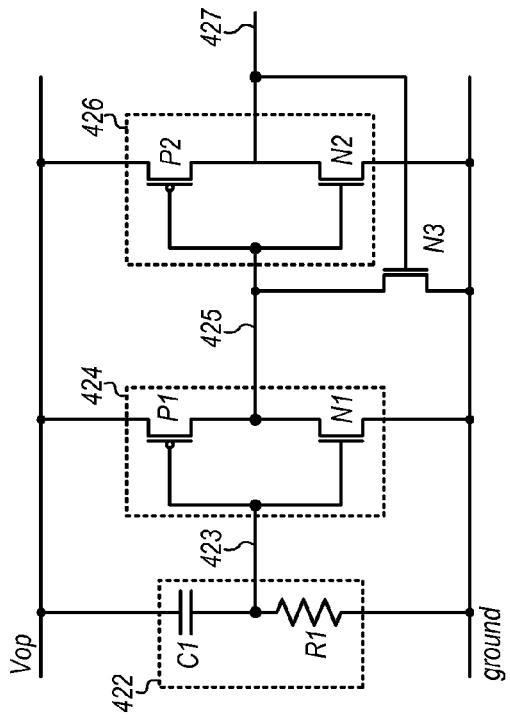
FIG. 4B is schematic diagram of one embodiment of an aging detection circuit.
Figure 5:
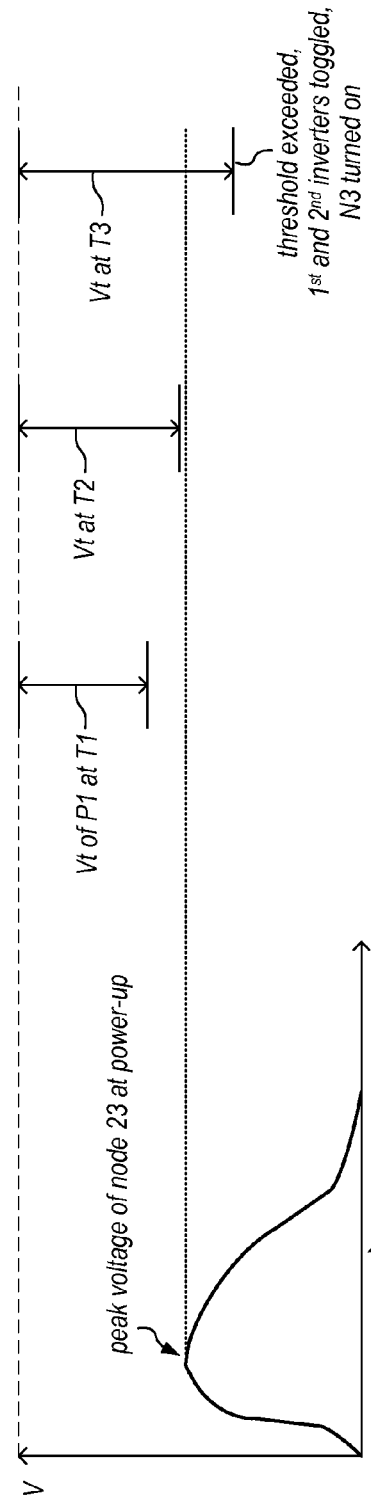
FIG. 5 is a graphic illustrating the functioning of one embodiment of an aging detection circuit over time.

FIGS. 4A, 4B, and 5—Exemplary Aging Detection Circuit and Operation

FIG. 4A is a logic diagram of one embodiment of ADC 320. In the embodiment shown, ADC 320 includes a filter 422, first inverter 424, second inverter 426, and feedback transistor N3. Filter 422 in the embodiment shown is a high pass filter including capacitor C1 and resistor R1, although other types of filters (e.g., low pass or band pass) may be used as well. In some embodiments, filter 422 may be replaced by other circuitry, including circuitry that may mimic its behavior. Embodiments utilizing digital filters are also possible and contemplated. Furthermore, filter 422 may be replaced in some embodiments by an up/down counter coupled to a digital-to-analog converter (DAC) to generate the input voltage at the input of first inverter 422. In general, any suitable type of circuitry for generating a momentary input voltage on the input of inverter 424 may be used in various embodiments of ADC 320.

In the embodiment shown, filter 422 is configured such that when power is initially applied to node Vop (the operating voltage node), the voltage on the input of inverter 424 rises and then falls in a manner comparable shown in graph 500 of FIG. 5. This voltage may or may not rise to a level sufficient to change the output of inverter 424. The output of inverter 424 may be provided to the input of inverter 426. The output of inverter 426 may be provided to transistor N3, and may also be provided to other units, such as power control unit 315 as shown in FIG. 3. Inverter 426 and transistor N3 are arranged to form a half-latch circuit in the embodiment shown, wherein a change of the input/output state of inverter 426 to a logic one (high voltage) may be held via activation of transistor N3.

The state of the output of inverter 424 may depend both on the state of its input, as well as on the state of transistor N3. In the embodiment shown, if the input of inverter 424 is a logic 0 (e.g., a low voltage), then its output will be a logic 1 if transistor N3 is inactive. The logic 1 on the output from inverter 424 may be input into inverter 426, causing the output of inverter 426 to output a logic 0. The logic 0 (which is a low voltage in this example) may in turn cause transistor N3 to remain inactive. Furthermore, a logic 0 output by inverter 426 may indicate that ADC 420 has not detected aging up to at least a certain aging threshold. A logic 1 output by inverter 426 may indicate that ADC 420 has detected aging up to or beyond that threshold.

If the voltage on the input of inverter 424 rises sufficiently during the initial power up sequence (e.g. to the toggle point, or trip point, of the inverter), the output of inverter 424 may change states from a logic 1 to a logic 0. If the output of inverter 24 (and thus the input of inverter 26) changes to a logic 0, inverter 426 may respond by outputting a logic 1. The outputting of the logic 1 by inverter 426 may result in a gate voltage sufficient to turn on transistor N3. When transistor N3 is activated, a pull-down path may exist between the output node of inverter 424 and ground. Accordingly, the output of inverter 424 may be pulled down toward ground (and thus toward a logic 0), irrespective of the logic value on its input. The logic 0 on the output of inverter 424 may cause the output of inverter 426 to be a logic 1, thereby causing transistor N3 to remain active. Accordingly, the half-latch circuit formed by inverter 426 and transistor N3 in the embodiment of FIG. 4A is arranged such that once transistor N3 is active, the input and output states of inverter 426 may be held to the same values for the remainder of time that power is applied to ADC 420. As a result, even if the input of inverter 424 falls to a logic 0, the logic 0 output state of inverter 424 may be enforced by the activation of transistor N3.

FIG. 4B is schematic diagram that further illustrates an embodiment of ADC 320. In the embodiment shown, first inverter 424 includes a PMOS (p-channel metal oxide semiconductor) transistor P1 and an NMOS (n-channel metal oxide semiconductor) transistor N1. Transistor P1 in this embodiment includes a source terminal coupled to Vop, a drain terminal coupled to node 425, and a gate terminal coupled to node 423. Transistor N1 in this embodiment includes a drain terminal coupled to node 425, a source terminal coupled to ground, and a gate terminal coupled to node 423. Inverter 426 in the embodiment shown includes PMOS transistor P2 and NMOS transistor N2. Transistor P2 in this embodiment includes drain and source terminals coupled to node 427 and Vop, respectively, and a gate terminal coupled to node 425. Transistor N2 in this embodiment includes drain and source terminal coupled to node 427 and ground, respectively, and a gate terminal coupled to node 425. As with the embodiment of FIG. 4A, a half-latch circuit is formed by inverter 426 and transistor N3. Transistor N3 in this embodiment includes gate, drain, and source terminals coupled to node 427, node 425, and ground, respectively. ADC 320 as shown in FIG. 4B also includes capacitor C1 and resistor R1 (coupled together at node 423), although as previously noted, other filter embodiments are possible and contemplated.

When a voltage equivalent to a logic 0 is provided to node 423 (i.e. the input node of inverter 424) in the embodiment shown, transistor P1 may be active while transistor N1 may be inactive. Accordingly, transistor P1 may remain active for nearly the entire time power is applied to ADC 320. When power is initially applied to ADC 320, a low voltage is present on the input of inverter 424, and thus transistor P1 may activate. If the initial voltage bump illustrated in graph 421 of FIG. 5 does not rise to a level sufficient to turn off transistor P1, it may thus remain active for the remainder of time that power is applied to ADC 320. Accordingly, transistor P1 may be subject to degradation mechanisms that occur with the aging of a PMOS transistor. In this particular example, transistor P1 may be subject to at least the degradation mechanism of negative bias temperature instability (NBTI). NBTI may cause the magnitude of the threshold voltage to increase over time, and this may affect whether or not P1 is turned off, at least momentarily, during a subsequent power on sequence.

When transistor P1 is on, a pull-up path between node 425 and Vop may be provided. If transistor N1 is turned off while P1 is on, then node 425 may be pulled up toward Vop. This may result in a logic 1 voltage present on node 425. As a result of the logic 1 voltage on node 425, transistor N2 of inverter 426 may be active, while transistor P2 may remain inactive. When active, transistor N2 may provide a pull-down path between node 427 and ground, thereby causing a logic 0 voltage to be present on that node. The logic 0 voltage present on node 427 may be insufficiently high to activate transistor N3.

If, during a power up sequence, the voltage present on node 423 rises sufficiently high, transistor P1 may be momentarily deactivated. Transistor N1 may become active, thereby providing a pull-down path between node 425 and ground. Accordingly, inverter 424 will have changed its input/output states, at least momentarily, as a logic 0 voltage may be present on node 425. As a result of the logic 0 voltage on node 425, transistor N2 may be deactivated, while transistor P2 may become active. The activation of transistor P2 may result in a pull-up path between node 427 and Vop, while the deactivation of transistor N2 may block the pull-down path between node 427 and ground. Accordingly, node 427 may be pulled up toward the operating voltage present on Vop, which results in a logic 1 voltage being driven by inverter 426. The logic 1 voltage may further be sufficient to cause the activation of transistor N3. The activation of transistor N3 may then create a pull-down path between node 425 and ground. This may effectively force a logic 0 voltage onto node 425, and thereby force a logic 1 voltage onto node 427. The logic 0 on node 425 and logic 1 on node 427 may be held for the remainder of time that power is provided to ADC 320.

After the voltage on node 423 falls again, transistor N1 may be deactivated, while transistor P1 may be activated again if not previously deactivated. However, if N3 is active, it may continue to drive a low voltage (and thus a logic 0) onto node 425, regardless of the state of transistor P1. In various embodiments, transistors N3 and P1 are sized relative to each other such that N3 has more drive strength than P1. In one example, the respective channel width/length ratios of N3 and P1 are sized such that N3 is at least twice as large as P1. Accordingly, when both N3 and P1 are active, node 425 may be driven to a low voltage, even though P1 is active, since the drive strength of transistor N3 is sufficient to overdrive that of transistor P1. Furthermore, when both N3 and P1 are active, a situation may exist wherein a logic 0 is present both on the input and output of inverter 424.

It should be noted that the circuits illustrated in FIGS. 4A and 4B are exemplary, and thus other embodiments are possible and contemplated. For example, circuit may be implemented using different types of transistors and different logic levels, while still falling within the general scope of the particular circuit embodiments discussed herein. For example, the circuits illustrated in FIGS. 4A and 4B may be configured to utilize positive bias temperature instability (PBTI) in NMOS transistors, for example by swapping the resistor R1 and capacitor C1 in filter 422 (thus forming a low-pass filter) and replacing transistor N3 by a PMOS transistor P3 with its source connected to node Vop, drain connected to node 425, and gate connected to node 427.

FIG. 5 is a graph illustrating an example of the operation for one embodiment of ADC 320 with respect to aging. As previously noted, graph 500 illustrates an approximation of the voltage present on node 423 during the initial application of power to ADC 320. When power is initially applied to ADC 320, the voltage on node 423 may rise up to a peak value, and may then subsequently fall, the duration of this rise and fall may be short in duration, but may be long enough to turn off transistor P1 depending on its threshold voltage. At time T1 during the life of the circuit (e.g., at the beginning of its operating life), the magnitude of the threshold voltage of transistor P1 is small enough that the voltage rise on node 423 is not sufficient to change its state from active to inactive. At time T2, later during the life of the ADC 320, the magnitude of the threshold voltage of P1 has increased due to degradation mechanisms incurred during its operation. However, at time T2, the magnitude of the threshold voltage has not increase enough to cause transistor P1 to deactivate during the power on sequence. However, at time T3 during the life of ADC 320, the magnitude of the threshold voltage has increased enough that the peak voltage on node 423 is sufficient to cause at least a momentary deactivation of transistor P1. The momentary deactivation may be accompanied by a momentary activation of transistor N1, thereby resulting in a logic 0 on node 425, a logic 1 on node 427, the activation of transistor N3, and the holding of node 425 to a logic 0 even after the voltage on node 23 falls enough to allow P1 to become active again.

Figure 6:
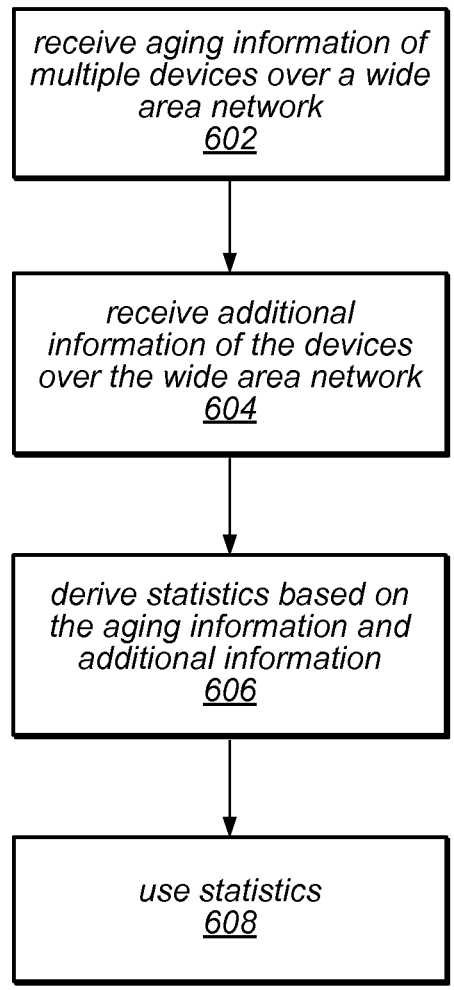
FIG. 6 is a flow diagram of one embodiment of a method for collecting aging information.

FIG. 6—Collecting Aging Information from Multiple Devices

FIG. 6 illustrates a method for collecting aging information from multiple devices. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, aging information may be received and stored regarding multiple devices over a wide area network. For each respective device, the aging information may specify aging of one or more electronic circuits in the respective device. For example, the aging information may be the aging information reported by the aging detection circuits described above. Alternatively, the aging information may be derived from the output of the aging detection circuits described above. In other words, the aging information may be the aging information directly provided from the aging circuits or any derived information that indicates aging of the device. For example, the number of thresholds that have been exceeded, following the descriptions of FIGS. 3-5, qualifies as aging information.

The devices may all be of a similar type, e.g., manufactured by a common manufacturer and/or according to a common design. For example, each device may be of a same model (or a substantially similar model), e.g., within a generation of the device type. As a specific example, the devices may all be within a same generation of a same type of device (e.g., they may all be $4^{th}$ generation iPhones®, where the generation is 4 and the type is iPhone®). In cases where the devices are not of the same generation or model, they may be sufficiently similar that the aging information is comparable among the different types or models of devices. For example, the different devices may include similar circuits and are expected to have similar aging characteristics.

The aging information may be received in any of a variety of ways. For example, following the exemplary embodiment of FIG. 1B, the aging information may be provided from each device to a respective local computer system, e.g., that executes management software for managing the device. As used herein, "local computer" refers to a computer system that the device communicates with that is within a relatively short distance from the device. For example, the device and local computer may be coupled via a cable (e.g., via USB) that is less than ten feet in length. Alternatively, the local computer may be within wireless communication distance using a short wireless communication protocol (e.g., over Bluetooth or 802.11x wireless communication). The local computer may be within 5 feet, 10 feet, 20 feet, 25 feet, 50 feet, or 100 feet of the device when the aging information is provided. The local computer, in turn, may provide the aging information of its respective device(s) (e.g., there may be more than one device that the local computer manages) to one or more servers (one or more remote computer systems) over the wide area network in 602. Alternatively, such as is shown in the example of FIG. 1C, each device may provide its own aging information to the one or more servers directly, e.g., over the wide area network, without using a local computer. For example, each device may communicate the aging information to the one or more servers using a cellular data plan or via an access point (e.g., an 802.11x access point).

In 604, additional information may be received and stored regarding the devices. The additional information may include operating parameters of the devices. For example, the additional information may include an operating frequency of each device. Further, one or more operating voltages of each devices may be received. There may be a single operating voltage for each device or there may be multiple voltages. For example, each device may operate at different voltages according to its mode (e.g., it may operate at a first voltage while in video mode, a second voltage while in phone mode, a third voltage while browsing the Internet, etc.). Accordingly, the different operating voltages may be received in the additional information. Similarly, there may be multiple operating frequencies for different modes, as desired.

In some embodiments, the additional information may include usage information, which may indicate various values indicating how the device has been used. For example, the usage information may include overall "on" time (how long the device has been powered on), overall standby time, overall processing time (how much processing time the device has performed), peak performance time (how long the device has been operated at peak performance), charging time (how long the device has been charged), talk time (e.g., how long the user has used the phone to make phone calls), data transfer time, time spent in various modes of the device, e.g., including video mode, game play mode, music listening mode, web browsing mode, email checking mode, texting mode, application specific mode, built-in application mode, third party application mode, etc. This usage information may be gathered via the aging circuits described above or via software, as desired. For example, software may monitor the mode that it is currently in and log the information for different modes or processes. For example, the software may store a table of the different categories described above (among others) and have a cumulative time for each of the different categories. Other metrics are envisioned other than time.

It should be noted that the aging of the electronic circuits and the usage information may be highly correlated. More specifically, since the circuits only experience significant aging when they are used, the usage may generally indicate the aging of the circuits and vice versa. However, the aging information may better reflect the actual electronic condition of the device if it is determined as a function of operating conditions (e.g., operating voltage, operating frequency, and/or temperature) during actual use rather than simply usage data.

The additional information may include other types of information. For example, the additional information may include battery condition information, e.g., how many charging cycles the battery has been through, the degree of depletion of the battery, the amount of power the battery is still able to supply, etc. The additional information may also include location information (e.g., where the device includes GPS circuitry or is otherwise able to determine its location). For example, the location information may indicate the area (e.g., city or region of country) that the device is usually located or operated, the different areas the device has traveled to, the location of the device, the altitude of the device while it is providing the aging information, etc. In some embodiments, the additional information may include temperature information, e.g., average temperature of operation, average ambient temperature, highest ambient temperature, lowest ambient temperature, highest temperature of operation, number of temperature cycles experienced, etc. The additional information may also include shaking information, e.g., indicating how much or how often the device has been shaken, such as while playing a game or from rough treatment. The shaking information may be gathered by accelerometers included in the device. The additional information may also indicate when the device was initially manufactured or initially activated for use (e.g., by the user).

In 606, statistics may be derived for the devices using the aging information received in 602. More particularly, the statistics may relate to operation of the devices. As some examples, the statistics may include the average aging of devices, best and worst case aging, distribution of aging, etc. according to actual electronic aging of the devices.

Further, the statistics may also be derived using the additional information received in 604. More specifically, the statistics may include average aging according to any of the information gathered in the additional information, among other possibilities. For example, the statistics may indicate aging with respect to various usage, e.g., which modes or application cause the device to age more quickly than others. The statistics could further indicate aging according to different locations. For example, it may be that devices used in colder climates age more slowly than devices used in warmer clients, or that users in a certain area generally use the device more often than users in a different area. The statistics could further indicate correlations between battery condition and aging information, e.g., how quickly aging occurs as a function of charging cycles. The statistics could also indicate how shaking of the device affects aging of the device. Thus, statistics may be derived and stored regarding aging of the device in relation to the various additional information discussed above.

In 608, the statistics may be used for various purposes, such as those described in the flowcharts below, among others. For example, the statistics may be used to refine assumptions of use of the devices. This may be particularly beneficial when designing new devices (e.g., of the same type of device). More particularly, in order to guarantee an operational lifetime of a device (e.g., 5 years), certain assumptions have to be made regarding usage of the device for design parameters. Typically, designers use very conservative usage estimations. For example, worst case scenarios may be used, e.g., where it is assumed that the device will be used nonstop for 5 years. By gathering the statistics, more realistic cases may be determined that may be used in the design process. For example, an actual worst case aging/usage may be determined by finding the maximum aged device among the multitude of devices. Accordingly, this worst case could be used as the worst case assumption of the device. Other actual cases (or average cases) could be used for the assumption of aging, as desired.

In some embodiments, the statistics may be used to determine operating parameters for the devices for which the aging information was received. For example, the average aging of the devices may be used to determine what operating parameters should be used for the average device or for particular sets of devices. In one embodiment, a data structure may be generated that indicates the values of operating parameters for different sets of aging information (e.g., different ranges of aging information). For example, the data structure may indicate operating parameters for different thresholds of aging, e.g., devices that have aged to a first threshold may have a first set of operating parameters, devices that have aged to a second threshold may have a second set of operating parameters, etc. The data structure may also be based on any of the additional information described above as well. As described below, operating parameters may be determined for individual devices based on the aging information and/or additional information of the respective device, and the respective device may be updated to operate according to those operating parameters. For example, in one embodiment, the data structure may include a database where a query can be formed using aging information and/or additional information of a particular device, and a set of operating parameters may be returned.

In further embodiments, the statistics may be used for evaluating the components used in the devices, such as the quality and life expectancy of the battery used in the device (e.g., based on battery condition information). Thus, the derived statistics may be used for a variety of purposes, as desired.

Figure 7:
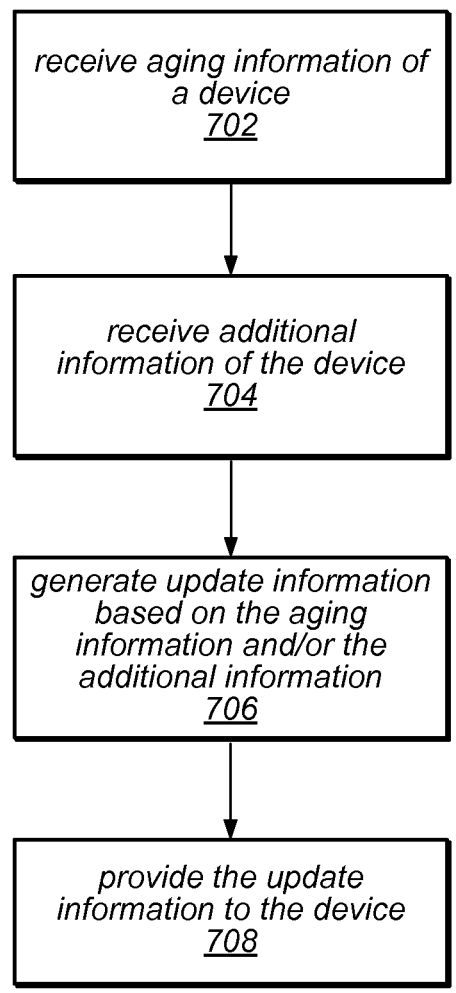
FIG. 7 is a flow diagram of one embodiment of a method for updating a device based on aging information.

FIG. 7—Updating Operating Parameters of a Device Based on Aging Information

FIG. 7 illustrates a method for updating a device based on aging information. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 702, aging information of a device may be received. The descriptions of the aging information and the device of 602 apply to 702 as well. Additionally, 702 may be performed by one or both of the local computer system (e.g., that manages the device 702) or the remote computer system(s) (e.g., one or more servers over a wide area network). For example, the aging information may be received from the device to the local computer, which may store the aging information (e.g., for processing as described below) or provide the aging information on the remote computer system(s). Alternatively, the aging information may be provided from the device to the remote computer system(s) without using the local computer system as a go-between.

In 704, additional information of the device may be received. Similar to 702, the descriptions of 604 also apply. Further, 704 may be performed by one or both of the local computer system or the remote computer system(s).

In 706, update information may be generated based on the aging information and/or the additional information. The update information may be generated by the local computer system and/or the remote computer system(s). For example, the update information may be generated by the local computer system using the management application for managing the device. In this embodiment, the management application may include program instructions for determining the update information based on the received aging and/or additional information. For example, the management application may have been provided or updated to include these update program instructions from the one or more remote computer systems. Said another way, the management program may be updated (e.g., periodically) by the remote computer systems to include the program instructions for determining the update information. Alternatively, the remote computer system(s) themselves may determine the update information, which may either be provided to the device directly in 708

(e.g., where there is no intervening local computer system) or may be provided to the local computer system for provision to the device in 708.

The update information may be determined based on the received aging information and/or the additional information according to a variety of methods. For example, if the aging information indicates advanced or significant electronic age of the device, the device may be updated to ensure that it will meet operational life specifications (e.g., five years). However, if the aging information does not indicate significant electronic age (e.g., where the device would not meet operational life specifications), an update may not be required. Alternatively, if the device has not experienced much aging, the update information may modify the operating parameters to other values, e.g., increasing operating frequency to increase device performance. More specifically, the update information may attempt to optimize one or more operating characteristics of the device based on current aging. For example, the update information may primarily ensure that the device may meet operational life specifications. Once this goal is ensured, the update information may attempt to increase performance of the device (e.g., increasing from an operating frequency of, for example, 1 GHz to 1.1 GHz), increase battery life expectancy, device battery life per battery charge (e.g., by decreasing voltage to consume less battery power during operation), decrease a rate of aging of the device, etc.

The priority of the above choices may vary. For example, in early life, system performance may be more important than battery life, while, in cases where the device has aged significantly, battery life may be more important than providing a better system performance (e.g., the system performance may be lowered in order to maintain a certain battery life). In one embodiment, the update information may attempt to guarantee a certain battery life of the device (e.g., on a per charge basis), and then attempt to maximize system performance. Thus, as one particular example, the aging information and additional information (e.g., battery condition information) may be used to determine settings that a) ensure that the device will meet life expectancy requirements, b) meet minimum battery life expectations while still ensuring a), and c) provide the highest system performance while still ensuring a) and b).

In one embodiment, the update information may be determined based on a rate of aging of the device. For example, a rate of aging may be determined by comparing the manufacture date or date of activation by the user with the current age, using a known baseline of the electronic circuits being measured. Accordingly, it may be determined how quickly the device has been aged, and operating parameters may be determined based on that age. More specifically, more conservative parameters may be used when the device has a high rate of aging whereas more aggressive parameters may be used when the device has a lower rate of aging. Generally, conservative parameters may safeguard against aging (e.g., by decreasing operating frequency) whereas aggressive parameters may attempt to maximize performance or other operating characteristics (e.g., by increasing operating frequency or enabling features that are disabled by default).

The update information may be generated based on various baseline operating parameters. For example, it may be known that a specific set of operating parameters will allow the device to meet its operational life specification, e.g., since these operating parameters were initially determined based on a conservative estimate of use (e.g., that the device will be turned on all the time for the entirety of its lifetime). Accordingly, such a baseline may be used to determine the update information for the particular device. For example, a device that has aged significantly may need to use these baseline operating parameters (or similar operating parameters) in order to meet the operational life specification. Other baselines may also be used for generating the update information, e.g., minimal use baselines, average use baselines, etc. In one embodiment, the update information may be interpolated between baselines or various heuristics may be used to determine the update information.

The update information may be based on the additional information in addition to the aging information. For example, devices that have been shaken often (e.g., while playing a game) may have a higher rate of aging. Accordingly, more conservative operating parameters may be used for such devices. Similarly, devices that have experienced higher temperatures (e.g., operational or ambient) or had more temperature cycles (e.g., where the device was forced to reduce power consumption due to a high temperature) may need more conservative operating parameters than devices that have not. Further, devices that are used in more processor intensive applications than others (e.g., playing video or video games versus browsing the web or listening to music) may age more quickly than others.

In some embodiments, the update information may also be based on aging information received from a multitude of devices. For example, the update information may be based on the statistics determined in 606 above. Accordingly, 706 may provide one example of use of the statistics, as indicated in 608. In one embodiment, the statistics may help in determining the baseline operating parameters described above. Additionally, or alternatively, the statistics may be used to determine the correct parameters to achieve the desired operating characteristics described above. For example, the statistics may be used to determine what operating parameters can be used for the current device given its aging information (and/or additional information) to achieve the operating characteristics described above based on aging of other devices that have similar aging or other conditions. Said another way, the aging of other devices in a similar condition (or a previously similar condition) may be used to determine appropriate operating parameters of the device. For example, previously effective operating parameters of other devices in a similar condition may be used as the operating parameters (e.g., with modification, as desired) for the current device.

As one particular example, the statistics may indicate that devices within a certain area age less than devices within another area. Accordingly, based on the location information provided by the device, the update information may be determined according to the statistics regarding electronic aging of devices. As a specific example, the device is located in an area where the statistics indicate that the device may age more slowly than in other areas, the update information may use operating parameters under the assumption that the device will age more slowly than others (e.g., the operating voltage may be set to a lower amount since the future aging does not require significant increases in voltage or the operating frequency may be increased to allow the device to operate faster since the future aging will not impede the performance).

As another example, the statistics may indicate that devices that are shaken often age faster than devices that do not. The statistics may even indicate the extent of the relationship between shaking and electronic aging, which may be used to determine appropriate operating parameters of the device. For example, the statistics may indicate that devices that are shaken the amount of the current device generally need to be updated to conservative parameters in order to reach the operational lifetime of the device.

In one embodiment, the update information may be generated by accessing a data structure (e.g., a table) that includes sets of aging information and corresponding sets of operating parameter information. As indicated above, the data structure may include a database that may be used to determine operating parameters based on the aging information and/or the additional information of the device. The content of the data structure may be determined using any of the methods described above to determine update information. For example, the data in the data structure may be based on the statistics determined in FIG. 6, baseline parameters, etc. Where the data structure is based on statistics, it may be updated periodically as new aging information and statistics are derived, e.g., following the method of FIG. 6.

In 708, the update information may be provided to the device to modify one or more operating parameters of the device. For example, the update information may be provided as a software or firmware update to the device. In one embodiment, the device may include a data structure that specifies the operating parameters that the device uses during operation and the update may modify the operating parameters according to the update information determined in 706. Accordingly, after modifying these operating parameters, the device may operate according to the new operating parameters.

The method described above may be performed for multiple devices, e.g., via a local computer system (e.g., where the local computer system manages the multiple devices) or via multiple local computer systems. Alternatively, the method described above may be performed without requiring the use of local computer systems, as already mentioned.

Additionally, the method described above may be performed multiple times for a device over the lifetime of the device. Accordingly, the device's operating parameters may be adjusted over time as the device ages.

Figure 8:
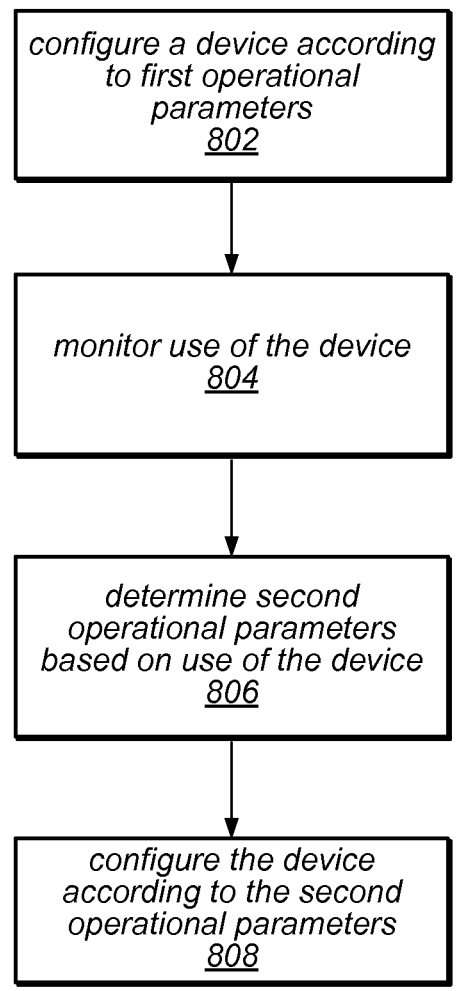
FIG. 8 is a flow diagram of one embodiment of a method for modifying operating parameters of a device over time.

FIG. 8—Modifying Operating Parameters of a Device Over Time

FIG. 8 illustrates a method for modifying operating parameters of a device over time. The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, the device may be configured according to one or more first operating parameters. The one or more first operating parameters may be above one or more sustainable operating parameters. More specifically, the sustainable operating parameters may have been determined based on assumptions of use of the device and the first operating parameters may exceed those sustainable operating parameters. As used herein, operating parameters that are "above" the sustainable operating parameters refer to operating parameters that, if used, would not meet the life expectancy of the device if used according to the assumptions of use of the device. Accordingly, while in many cases these operating parameters have a higher value than the sustainable operating parameters (e.g., higher operating frequency), "above" does not necessarily mean the operating parameters have a higher value than the sustainable operating parameters.

In one embodiment, the assumptions of use may be above average use, e.g., an assumption that exceeds 60%, 70%, 80%, 90%, 95%, 98%, etc. of average use of the device. In some embodiments, the assumptions of use may be a worst case assumption of use, e.g., where the device is operated at maximum performance for the lifetime of the device.

In 804, use of the device may be monitored. For example, the use of the device may be monitored by receiving the aging information and/or additional information (e.g., the usage information) described in 702 and 704 of FIG. 7. However, monitoring use of the device may not require the aging information. For example, the usage information and/or other additional information could be used to monitor use of the device without needing the aging information described above. However, using as much information as possible to monitor use of the device may be desirable, e.g., including the aging information. Additional methods of monitoring use of the device are envisioned.

In 806, one or more second operating parameters may be determined based on the use of the device. The one or more second operating parameters may be lower than the one or more first operating parameters. Additionally, the second operating parameters may be the same as or different than the sustainable operating parameters. For example, if the device has been used often (e.g., has aged significantly), the second operating parameters may be the same as or similar to the sustainable operating parameters. However, if the device has not been used as often (e.g., has not aged significantly), the second operating parameters may still be greater than the sustainable operating parameters. In general, the one or more second operating parameters may be determined similar to the manner that the update information was determined in 706 of FIG. 7, which was determined based on the aging information, additional information, and/or statistical information derived from aging/additional information of the multitude of devices.

Additionally, or alternatively, the one or more second operating parameters may be determined based on updated assumptions of use of the device. For example, the assumptions of use of the device may be updated based on statistics of actual use, e.g., as determined in the method of FIG. 6. Accordingly, the one or more second operating parameters may be based on these changed assumptions, e.g., in addition to, or alternative to, the monitoring of use in 804. Similar descriptions apply to the update information determined in FIG. 7.

In 808, the device may be configured according to the one or more second operating parameters. 808 may be performed similarly to 708 above.

The method of FIG. 8 may be performed by any of a variety of systems. For example, the device itself operate according to the first parameters, monitor use of the device, and configure itself according to one or more second parameters (e.g., that were determined by the device, e.g., using software, or that were pre-stored on the device). Additionally, or alternatively, a computer system may perform the method of FIG. 8. For example, a local computer system may initially configure the device, monitor use of the device (e.g., by receiving aging information and/or additional information during the lifetime of the device), determine the second operating parameters based on the monitoring, and configure the device according to the second operating parameters. In one embodiment, one or more remote computer systems (e.g., servers) may perform the method. For example, the remote computer systems may monitor use of the device (e.g., by receiving the aging information and/or additional information from the device or from the local computer system), determine the second operating parameters, and then configure the device according to the second operating parameters (e.g., with or without using an intermediary local computer system). Thus, the method of FIG. 8 may be performed in a variety of different manners by a variety of different devices.

Thus, the method of FIG. 8 takes advantage of the fact that devices may be initially configured at operating parameters that exceed normal, conservative operating parameters determined at design since these operating parameters can be changed over the lifetime of the device, if necessary. This may allow the device to have better system performance and/or battery life at no additional design or technology cost. Thus, a better user experience may be achieved according to this method.

Numerous variations and modifications will become apparent to those skilled in the art once the above disclosure is fully appreciated. It is intended that the following claims be interpreted to embrace all such variations and modifications.

What is claimed is:

1. A method for operating a device, the method comprising:
    configuring the device according to one or more first operating parameters, wherein the one or more first operating parameters are above one or more sustainable operating parameters, wherein the one or more sustainable operating parameters are determined based on at least one assumption of use of the device, wherein the at least one assumption comprises above average use;
    monitoring use of the device;
    providing aging information to a computer system over a network based on said monitoring aging of the device;
    receiving one or more second operating parameters from the computer system based on said providing the aging information; and
    configuring the device according to one or more second operating parameters based on said monitoring the use of the device, wherein the one or more second operating parameters are lower or higher than the one or more first operating parameters.

2. The method of claim 1, wherein the at least one assumption comprises an assumption of use that exceeds 80% of cases of use.

3. The method of claim 1, wherein the operating parameters comprise one or more operating frequencies.

4. The method of claim 1, wherein the operating parameters comprise one or more operating voltages.

5. The method of claim 1, wherein said configuring, said monitoring, and said configuring is performed by the device.

6. The method of claim 1, wherein said configuring, said monitoring, and said configuring are performed by a computer system, wherein said monitoring comprises receiving aging information of the device one or more times.

7. The method of claim 6, wherein the computer system is coupled to one or more servers, wherein the method further comprises:
    the computer system providing the aging information to the one or more servers over a wide area network; and
    the computer system receiving the one or more second parameters from the one or more servers over the wide area network.

8. The method of claim 1, wherein said configuring, said monitoring, and said configuring are performed by one or more servers, wherein said configuring the device according to the one or more first operating parameters comprises providing the one or more first operating parameters over a wide area network, wherein said monitoring use of the device comprises receiving aging information over the wide area network, and wherein said configuring the device according to the one or more second operating parameters comprises providing the one or more second operating parameters over the wide area network.

9. The method of claim 1, wherein said configuring the device according to one or more second operating parameters is also based on statistics of a plurality of devices.

10. The method of claim 1, further comprising:
    monitoring battery condition of the device;
    wherein said configuring the device according to one or more second operating parameters is also based on the battery condition of the device.

11. A non-transitory computer-readable memory medium comprising program instructions for updating a device, wherein the program instructions are executable to:
    monitor use of a device, wherein the device initially operates according to one or more first operating parameters, wherein the one or more first operating parameters are above one or more sustainable operating parameters, wherein the one or more sustainable operating parameters are determined based on at least one assumption of use of the device, wherein the at least one assumption comprises above average use;
    monitor aging of the device;
    provide aging information to a computer system over a network based on said monitoring aging of the device;
    receive one or more second operating parameters from the computer system based on said providing the aging information; and
    configure the device according to one or more second operating parameters based on said monitoring the use of the device, wherein the one or more second operating parameters are lower or higher than the one or more first operating parameters.

12. The non-transitory computer-readable memory medium of claim 11, wherein the program instructions are executable to:
    receive an update for the device, wherein the update includes the one or more second operating parameters, wherein said receiving the one or mores second operating parameters comprises receiving the update to the device.

13. The non-transitory computer-readable memory medium of claim 11,
    wherein the program instructions comprise a management program for the device.

14. The non-transitory computer-readable memory medium of claim 11, wherein the one or more second operating parameters are determined at least partially based on an update of the at least one assumption of use of the device.

15. An electronic device, comprising:
    one or more aging circuits configured to determine aging information of the electronic device;
    a memory coupled to the one or more aging circuits for storing the aging information;
    control logic, wherein the control logic is configured to:
        initially operate the device according to one or more first operating parameters, wherein the one or more first operating parameters are above one or more sustainable operating parameters, wherein the one or more sustainable operating parameters are determined based on at least one assumption of use of the device, wherein the at least one assumption comprises above average use;
        monitor aging of the device;
        provide aging information to a computer system over a network based on said monitoring aging of the device;
        receive the one or more second operating parameters from the computer system based on said providing the aging information; and modify the one or more first operating parameters to the one or more second operating parameters based on said monitoring the aging of the device, wherein the one or more second operating parameters are lower or higher than the one or more first operating parameters; and operate the device according to the one or more second operating parameters.

16. The electronic device of claim 15, wherein the operating parameters comprise an operating frequency, wherein the one or more first operating parameters comprise an operating frequency that is higher than the operating frequency of the one or more second operating parameters.

17. The electronic device of claim 15, wherein the operating parameters comprise an operating voltage, wherein the one or more first operating parameters comprise an operating voltage that is lower than the operating voltage of the one or more second operating parameters.

18. A system comprising:
an integrated circuit (IC) having one or more aging detection circuits each configured to provide an indication of aging of the IC, wherein the integrated circuit is initially configured according to one or more first operating parameters, including a first operating frequency that is higher than a sustainable operating frequency;
a storage unit configured to store one or more indications of aging each received from the one or more aging detection circuits, respectively;
an age compensator configured to:
determine an age of the IC by reading the one or more indications of aging from the storage unit;
wherein system is configured to:
provide aging information to a computer system over a network based on said monitoring aging of the device; and
receive the one or more second operating parameters from the computer system based on said providing the aging information; and
wherein the age compensator is further configured to:
modify the one or more first operating parameters to the one or more second operating parameters based on said monitoring the aging of the device, wherein the one or more second operating parameters are lower or higher than the one or more first operating parameters, including modify the first operating frequency to a second operating frequency based on said determining the age of the IC, wherein the second operating frequency is lower than the first operating frequency.

19. The system of claim 18, wherein the integrated circuit is initially configured according to a first operating voltage that is lower than a sustainable operating voltage, wherein the age compensator is further configured to modify the first operating voltage to a second operating voltage based on said determining the age of the IC, wherein the second operating voltage is higher than the first operating voltage.

20. A non-transitory computer-readable memory medium comprising program instructions for modifying operating parameters of a plurality of devices, wherein the program instructions are executable to:
receive aging information of the plurality of devices over a wide area network based on monitoring of aging of the plurality of devices, wherein, for each respective device, the aging information specifies aging of one or more electronic circuits in the respective device, wherein the plurality of devices are initially configured according to one or more first operating parameters, wherein the one or more first operating parameters are above one or more sustainable operating parameters, wherein the one or more sustainable operating parameters are determined based on at least one assumption of use of the device, wherein the at least one assumption comprises above average use;
for each device of a subset of the plurality of devices:
determine one or more second operating parameters based on the respective aging information of the device, wherein the one or more second operating parameters are lower than the one or more first operating parameters; and
provide the one or more second operating parameters to the device over the wide area network for modifying the one or more first operating parameters, wherein the one or more second operating parameters are lower or higher than the one or more first operating parameters, and wherein after modifying the one or more first operation parameters based on the one or more second parameters, the device is configured to operate according to the one or more second operating parameters.

21. The non-transitory computer-readable memory medium of claim 20, wherein the program instructions are further executable to:
determine statistical information of operation of the plurality of devices based on the aging information.

22. The non-transitory computer-readable memory medium of claim 20, wherein the program instructions are further executable to:
receive battery condition information of the plurality of devices over the wide area network;
wherein, for each of a subset of the plurality of devices, said determining the one or more second operating parameters is also based on the respective battery condition information of the device.

* * * * *